US007392506B2

(12) United States Patent
Garcowski et al.

(10) Patent No.: US 7,392,506 B2
(45) Date of Patent: Jun. 24, 2008

(54) METHOD, SYSTEM AND ARTICLE OF MANUFACTURE FOR TESTING A SOFTWARE APPLICATION HAVING A TEXT-BASED SCREEN WITH A TEST TOOL FOR A SOFTWARE APPLICATION HAVING A GRAPHICAL USER INTERFACE WHICH USES OBJECTS

(75) Inventors: Jason Chester Garcowski, Cary, NC (US); Lalitha Krishnamoorthy, Milpitas, CA (US); Zhong Tao, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 10/903,328

(22) Filed: Jul. 29, 2004

(65) Prior Publication Data

US 2006/0022972 A1    Feb. 2, 2006

(51) Int. Cl.
G06F 9/44 (2006.01)
G06F 9/45 (2006.01)
(52) U.S. Cl. .................. 717/107; 717/116; 717/120
(58) Field of Classification Search ......... 717/106–110, 717/116–118, 120–121
See application file for complete search history.

(56) References Cited

U.S. PATENT DOCUMENTS

| 5,475,843 | A  * | 12/1995 | Halviatti et al. | ............ 717/124 |
| 5,754,830 | A    | 5/1998  | Butts et al.     | .................. 395/500 |
| 6,252,591 | B1   | 6/2001  | Dockweiler et al. | ......... 345/335 |
| 6,279,030 | B1 * | 8/2001  | Britton et al.   | ............... 709/203 |
| 6,385,769 | B1 * | 5/2002  | Lewallen         | ..................... 717/125 |
| 6,408,430 | B2 * | 6/2002  | Gunter et al.    | ............... 717/109 |
| 6,480,895 | B1   | 11/2002 | Gray et al.      | .................. 709/231 |
| 6,505,342 | B1 * | 1/2003  | Hartmann et al.  | ........... 717/104 |
| 6,510,468 | B1   | 1/2003  | Hayne            | ........................ 709/246 |
| 6,519,605 | B1   | 2/2003  | Gilgen et al.    | ........... 707/103 R |
| 6,606,744 | B1 * | 8/2003  | Mikurak          | ..................... 717/174 |
| 6,637,020 | B1 * | 10/2003 | Hammond         | .................. 717/107 |
| 6,678,881 | B2 * | 1/2004  | Graham           | ...................... 717/116 |
| 6,697,088 | B1   | 2/2004  | Hollander        | .................... 345/744 |
| 6,701,513 | B1 * | 3/2004  | Bailey           | ........................ 717/109 |
| 6,915,520 | B2 * | 7/2005  | Sanchez, II      | ................. 719/315 |
| 6,922,824 | B2 * | 7/2005  | Swetland         | .................... 717/117 |
| 6,931,622 | B1 * | 8/2005  | Aldrich et al.   | ............... 717/107 |
| 6,989,254 | B2 * | 1/2006  | Wei et al.       | ..................... 435/176 |
| 6,993,748 | B2 * | 1/2006  | Schaefer         | ..................... 717/124 |
| 7,089,247 | B2 * | 8/2006  | Kloos et al.     | ................... 707/10 |
| 7,171,650 | B2 * | 1/2007  | Fenton et al.    | ............... 717/120 |
| 7,173,617 | B2 * | 2/2007  | Driemeyer et al. | .......... 345/426 |

(Continued)

OTHER PUBLICATIONS

Sun et al, "specification driven automated testing of GUI based Java programs" ACM ACMSE, pp. 140-145, 2004.*

(Continued)

Primary Examiner—Anil Khatri
(74) Attorney, Agent, or Firm—Janet M Skafar; Prentiss W. Johnson

(57) ABSTRACT

Various embodiments of a method, apparatus and article of manufacture that identify a boundary of a field of a text-based screen for a test tool are provided. These embodiments allow single test tool to test software applications that have a text-based screen and software applications that have a graphical user interface with Java objects.

19 Claims, 5 Drawing Sheets

U.S. PATENT DOCUMENTS

| | | | |
|---|---|---|---|
| 7,222,334 B2 * | 5/2007 | Casati et al. | 717/136 |
| 7,266,806 B2 * | 9/2007 | Choi et al. | 717/108 |
| 2004/0015839 A1 | 1/2004 | Sarkar et al. | |

OTHER PUBLICATIONS

Proulx et al, "Java IO and tetsing made simple", ACM SIGCSE, pp. 161-165, 2004.*

Visser et al, "Test input generation with Java PathFinder", ACM ISSTA, pp. 97-107, 2004.*

Bederson et al, "Jazz: An extensible zoomable user interface graphics tool kit in Java", ACM UIST, vol. 2, 2 pp. 171-180, 2000.*

"Open Host Interface Objects for Java," Fourth Edition (Mar. 2001), [online]. Mar. 2001 [Retrieved on Jul. 6, 2004]. Retrieved from the Internet: <URL:ftp://ftp.software.ibm.com/software/webserver/hostondemand/library/v503/ohio.zip>.

"Host Access Class Library for Java," [online]. Jul. 1999 [Retrieved on Jul. 12, 2004]. Retrieved form the Internet: <URL: http://128.151.50.16/hod/en/doc/hacl/API_users_guide.html>.

"Class com.ibm.eNetwork.ECL.ECLField," [online]. Jul. 1999 [Retrieved on Jul. 12, 2004]. Retrieved form the Internet: <URL: http://128.151.50.16/hod/en/doc/hacl/com.ibm.eNetwork.ECL.ECLField.html>.

"WebSphere Host On-Demand-Features and benefits—IBM Software," [online]. [Retrieved on Jul. 13, 2004]. Retrieved from the Internet: <URL: http://www-306.ibm.com/software/webservers/hostondemand/features.html>.

"Testing Java and Web applications with IBM Rational XDE Tester," [online]. Jun. 17, 2003 [Retrieved on Jul. 13, 2004]. Retrieved from the Internet: <URL: http://www-106.ibm.com/developerworks/rational/library/390.html>.

"Testing Java and Web applications with IBM Rational XDE Tester," [online]. Jun. 17, 2003 [Retrieved on Jul. 13, 2004]. Retrieved from the Internet: <URL: http://www-106.ibm.com/developerworks/rational/library/content/03July/2500/2542/2542.pdf>.

Weishaar , "Creating a data-driven test with XDE Tester," [online]. Jun. 17, 2003 [Retrieved on Jul. 13, 2004]. Retrieved from the Internet: <URL: http://www-106.ibm.com/developerworks/rational/library/384.html>.

Weishaar, "Creating a data-driven test with XDE Tester," [online]. Jun. 17, 2003 [Retrieved on Jul. 13, 2004]. Retrieved from the Internet: <URL: http://www-106.ibm.com/developerworks/rational/library/content/03July/2500/2598/2598.pdf>.

Red Oak Software Legacy Integrator SDK User's Guide, [online]. Jan. 18, 2001 [Retrieved on Jun. 25, 2004]. Retrieved from the Internet: <URL: http://www.redoaksw.com/pdf/LegacyUserGuide.pdf>.

Red Oak Software Legacy Integrator Solutions, EchoStar Communications Corp./Dish Network Significant and Measurable Return on Investment via Online Customer Care Technology, [online]. [Retrieved on Jun. 26, 2004]. Retrieved from the Internet: <URL: http://www.redoaksw.com/pdf/casestudy_echostar.pdf>.

Red Oak Software: Products: Legacy Integrator, [online]. © 1999-2004 Red Oak Software, Inc. [Retrieved on Jun. 26, 2004]. Retrieved from the Internet: <URL: http://www.redoaksw.com/prod_legint.html>.

Red Oak Software Legacy Integrator, [online]. © 2000-2001 Red Oak Software, Inc. [Retrieved on Jun. 26, 2004]. Retrieved from the Internet: <URL: http://www.redoaksw.com/pdf/legacy_datasheet.pdf>.

Red Oak Software Stingray, [online]. 2000 [Retrieved on Jun. 25, 2004]. Retrieved from the Internet: <URL: http://www.redoaksw.com/pdf/stingray_datasheet.pdf>.

Connector Central—Attachmate myEXTRA! Smart Connector for 3270 and 5250, [online]. [Retrieved on Jun. 25, 2004]. Retrieved from the Internet: <URL: http://wwws.sun.com/software/connectors/attachmate_terminal.html>.

"Host Access Library Java Objects," [online]. [Retrieved on Jul. 28, 2004]. Retrieved from the Internet: <URL: http://publib/boulder.ibm.com/inforcenter/hodhelp/topic/com.ibm.hostondemand.doc/doc/hacl/DWYL0M14.HTML#HDRCPLUS>.

":Class ECL Field", [online].[Retrieved on Jul. 28, 2004]. Retrieved from the Internet: <URL: http://publib.boulder.ibm.com/infocenter/hodhelp/index.jsp?topic=/com.ibm.hostondemand.doc/doc/hacl/com/ibm/eNetwork/ECL/ECLField.html>.

":Class ECL FieldList" [online]. [Retrieved on Jul. 28, 2004]. Retrieved from the Internet: <URL: http://publib.boulder.ibm.com/infocenter/hodhelp/index.jsp?topic=/com.ibm.hostondemand.doc/doc/hacl/com/ibm/eNetwork/ECL/ECLFieldList.html>.

":Class ECL ECLConnection" [online]. [Retrieved on Jul. 28, 2004]. Retrieved from the Internet: <URL: http://publib.boulder.ibm.com/infocenter/hodhelp/index.jsp?topic=/com.ibm.hostondemand.doc/doc/hacl/com/ibm/eNetwork/ECL/ECLConnection.html>.

":Class ECLPS" [online]. [Retrieved on Jul. 28, 2004]. Retrieved from the Internet: <URL: http://publib.boulder.ibm.com/infocenter/hodhelp/index.jsp?topic=/com.ibm.hostondemand.doc/doc/hacl/com/ibm/eNetwork/ECL/ECLPS.html>.

"Introduction to the Host Access Class Library" [online]. [Retrieved on Jul. 28, 2004]. Retrieved from the Internet: <URL: http://publib.boulder.ibm.com/infocenter/hodhelp/topic=/com.ibm.hostondemand.doc/doc/hacl/DWYL0M08.HTML #HDRINTRO>.

* cited by examiner

METHOD, SYSTEM AND ARTICLE OF MANUFACTURE FOR TESTING A SOFTWARE APPLICATION HAVING A TEXT-BASED SCREEN WITH A TEST TOOL FOR A SOFTWARE APPLICATION HAVING A GRAPHICAL USER INTERFACE WHICH USES OBJECTS

BACKGROUND OF THE INVENTION 1.0 Field of the Invention

This invention relates to testing software, and in particular, this invention relates to a method, system and article of manufacture for testing software applications that have a text-based screen with a test tool for testing software applications that have a graphical user interface that uses objects.

2.0 Description of the Related Art

Computer systems execute many software applications. A software application can comprise millions of lines of code. Therefore, it is important for organizations that develop software applications to test their software applications prior to selling that software to customers.

A test tool is a type of software application that is used to test other software applications. The test tool helps an organization to ensure the quality of a software application.

Some test tools are designed to test software applications that provide a graphical user interface in which the objects on the graphical user interface are Java® (Registered trademark of SUN Microsystems, Inc.) objects. One such test tool is the IBM® (Registered trademark of International Business Machines Corporation) Rational® (Registered trademark of Rational Software Corporation) XDE tester™, also referred to as the IBM® Rational® Functional Tester. Many software applications for mainframe computers have a text-based screen as a user interface, and do not have a graphical user interface which comprises Java objects. A user interacts with those software applications using the text-based screen. The text-based screen comprises cells which are organized into rows and columns. Each cell is typically associated with a character. Therefore, test tools which are designed to test software applications which have a graphical user interface with Java objects cannot be used to test software application that has a text-based screen. Organizations which develop software applications having a text-based screen and software applications having a graphical user interface with Java objects typically use two different test tools—one test tool for software applications having the text-based screen and another test tool for the software applications having a graphical user interface with Java objects. However, using two different test tools is more expensive than a using a single test tool.

Therefore there is a need to allow a single test tool to test software applications that have a text-based screen and software applications that have a graphical user interface with Java objects.

SUMMARY OF THE INVENTION

To overcome the limitations in the prior art described above, and to overcome other limitations that will become apparent upon reading and understanding the present specification, various embodiments of a method, apparatus and article of manufacture that identify a boundary of a field of a text-based screen for a test tool are provided. The text-based screen is associated with a screen Java object. The text-based screen has a text area and has text-based fields in the text area. The text-based fields are associated with respective field Java objects. A screen proxy Java object is associated with the screen Java object. The screen proxy Java object is accessible to the test tool. Field proxy Java objects are associated with respective field Java objects. The field proxy Java objects are accessible to the test tool. A starting screen pixel location of the text area of the screen Java object is determined. A text-based row, a text-based starting column and a text-based ending column which is associated with one of the field Java objects that is associated with a particular field proxy Java object are determined. A field corner pixel location is determined based on the text-based row, the text-based starting column and the starting screen pixel location. A field pixel width is determined based on the text-based starting column and the text-based ending column. A field pixel height is determined based on the text-based row. The field corner pixel location, the field pixel width and the field pixel height are provided to the test tool.

In some embodiments, the properties of the field are also provided to the test tool.

In this way, a method, apparatus and article of manufacture is provided to allow single test tool to test software applications that have a text-based screen and software applications that have a graphical user interface with Java objects.

BRIEF DESCRIPTION OF THE DRAWINGS

The teachings of the present invention can be readily understood by considering the following description in conjunction with the accompanying drawings, in which.

To facilitate understanding, identical reference numerals have been used, where possible, to designate identical elements that are common to some of the figures.

DETAILED DESCRIPTION

After considering the following description, those skilled in the art will clearly realize that the teachings of the various embodiments of the present invention can be utilized to allow a single test tool to test a software application that has a text-based screen and a software application that has a graphical user interface with Java objects.

Figure 1:
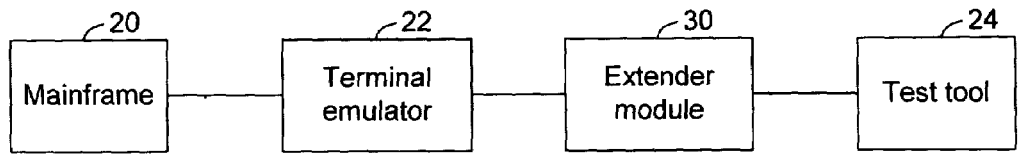
FIG. 1 depicts a block diagram of a system using an extender module in accordance with an embodiment of the present invention.

FIG. 1 depicts a block diagram of a system using an extender module in accordance with an embodiment of the present invention. A mainframe computer 20 sends a data stream to a terminal emulator 22. In various embodiments, the terminal emulator 22 supports at least one or any combination of TN3270E, TN5250, VT52, VT100, VT220, VT320, VT420 and IBM CICS® (Registered Trademark of International Business Machines Corporation) Transaction Gateway access. The terminal emulator 22 displays a text-based screen for a software application to provide a user interface. In some embodiments, the terminal emulator 22 is IBM® Websphere®(Registered Trademark of International Business Machines Corporation) Host On-Demand (HOD) with the Host Access Class Library (HACL).

A test tool 24 is provided. The test tool 24 is designed to test software applications having a graphical user interface with Java objects. The test tool 24 allows a user to set verification points and check various properties associated with the Java objects which are displayed in the graphical user interface. In some embodiments, the test tool 24 is the IBM® Rational® XDE tester™, also referred to as the IBM® Rational® Functional Tester. However, the present invention is not meant to be limited to the IBM® Rational® XDE tester™ or the IBM® Rational® Functional Tester and may be used with other software test tools.

An extender module 30 provides an interface between the terminal emulator 22 and the test tool 24. The extender module 30 allows the test tool 24 to be used to test software applications having a text-based screen. The text-based screen comprises fields. A field is associated with one or more rows, a starting column and an ending column. The terminal emulator 22 identifies the fields and associates a Java object with each field. The terminal emulator 22 displays the fields in the text-based screen as text, and not as Java objects. The extender module 30 provides an interface such that the fields of the text-based screen are identified to the test tool 24 which is designed to test software applications with a graphical user interface having Java objects. In some embodiments, the extender module 30 also allows various properties of the fields to be identified and provided to the test tool 24.

Figure 2:
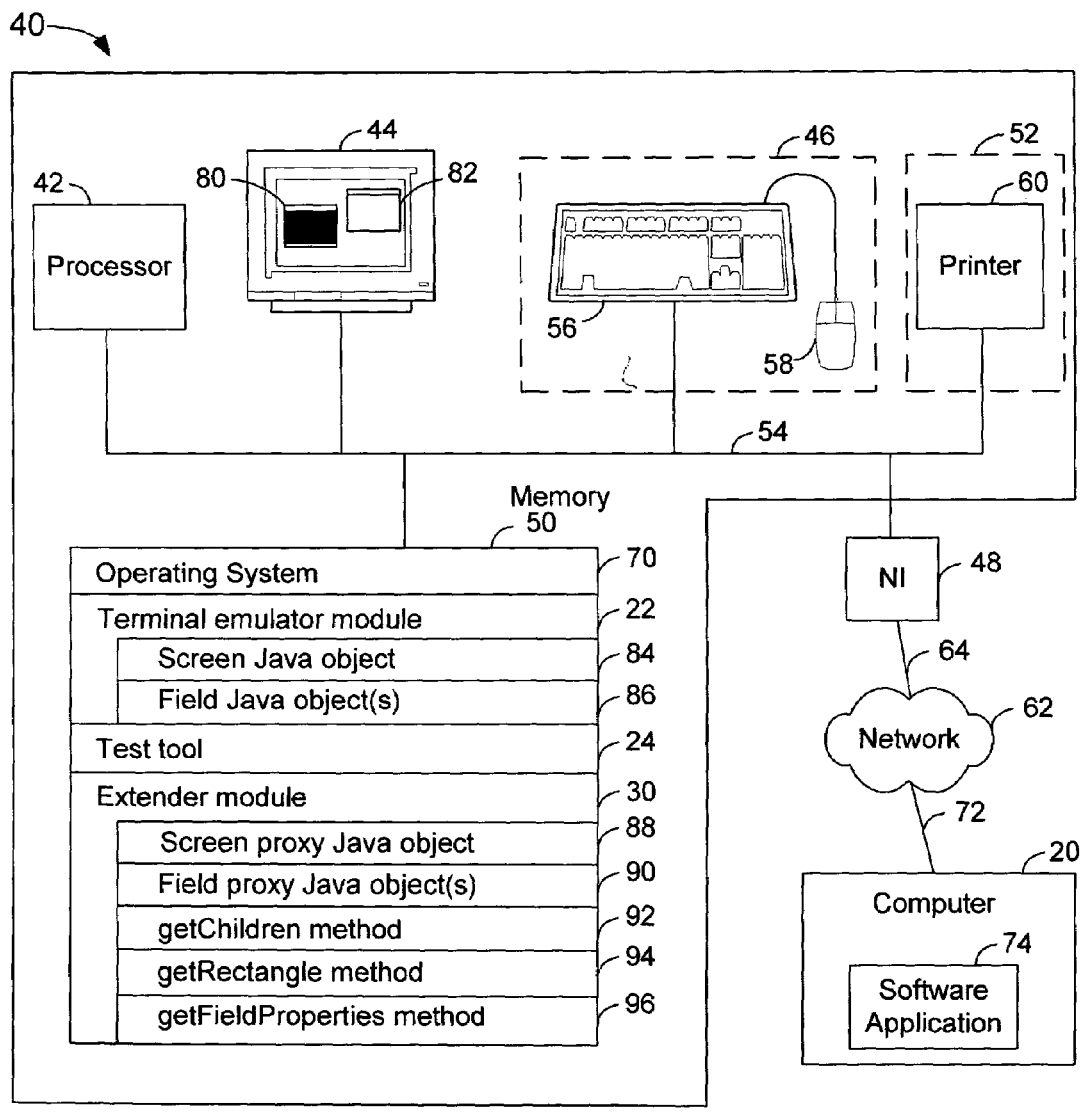
FIG. 2 depicts an illustrative computer system which uses various embodiments of the present invention.

FIG. 2 depicts an illustrative computer system 40 which uses various embodiments of the present invention. The computer system 40 comprises a processor 42, display 44, input interfaces (I/F) 46, communications interface 48, memory 50 and output interface(s) 52, all conventionally coupled by one or more buses 54. The input interfaces 46 comprise a keyboard 56 and a mouse 58. The output interface 52 comprises a printer 60. The communications interface 48 is a network interface (NI) that allows the computer 40 to communicate via a network 62 with the mainframe computer 20. The communications interface 48 may be coupled to a transmission medium 64 such as, a network transmission line, for example twisted pair, coaxial cable or fiber optic cable. In another embodiment, the communications interface 48 provides a wireless interface, that is, the communications interface 48 uses a wireless transmission medium.

The memory 50 generally comprises different modalities, illustratively semiconductor memory, such as random access memory (RAM), and disk drives. In various embodiments, the memory 50 stores an operating system 70, the terminal emulator 22, the test tool 24 and the extender module 30.

In some embodiments, the network 62 is connected, via another transmission medium 72, to a remote host computer system, for example, the mainframe computer 20, which executes a software application 74 which has a text-based screen. The terminal emulator 22 is used to connect the local computer system 40 to the mainframe computer system 20 via the network interface 48 and network 62 so that the software application 74 can be accessed. In various embodiments, the software application 74 executes on the mainframe computer system 20 in, for example, a z/OS® (Registered Trademark of International Business Machines Corporation), an OS/390® (Registered Trademark of International Business Machines Corporation), an AS400® (Registered Trademark of International Business Machines Corporation), a Linux® (Registered trademark of Linus Torvalds), or an OS/400® (Registered Trademark of International Business Machines Corporation) environment.

In various embodiments, the extender module 30 comprises one or more Java classes having various methods to provide an interface between the terminal emulator 22 and the test tool 24. In various embodiments, the extender module 30 is implemented using the Java® (Registered trademark of SUN Microsystems, Inc.) programming language. In some embodiments, the extender module 30 can make use of the Java Native Interface to include code which is written in a programming language other than Java.

The terminal emulator 22 displays the text-based screen 80 of the software application 74. The test tool 24 provides a graphical user interface 82 to interact with the user. Using various embodiments of the present invention, the user can use the test tool 24 and interact with the text-based screen 80 to test the software application 74.

The terminal emulator 22 has a screen Java object 84 and one or more field Java objects 86. The screen Java object 84 is associated with the text-based screen 80. Each field Java object 86 is associated with a respective field of the text-based screen.

In the extender module 30, a screen proxy Java object 88 is associated with the screen Java object 84. The test tool 24 can access the screen proxy Java object 84. The extender module 30 also comprises one or more field proxy Java objects 90. Each field proxy Java object 90 is associated with one of the field Java objects 86. The test tool 24 can access the field proxy Java objects 90. The extender module 30 comprises various classes, additional Java objects and methods. The test tool 24 invokes particular methods of the extender module 30. In some embodiments, the extender module 30 has a getchildren method 92 to provide the screen proxy Java object and the associated field proxy Java objects to the test tool 24. The extender module 30 also comprises a getRectangle method 94 and a getFieldProperties method 96. The getRectangle method 94 provides information to define a boundary of a particular field to the test tool 24. The getFieldProperties method 96 provides information about the field properties for a particular field to the test tool 24. The test tool 24 can invoke the getchildren method 92, the getRectangle method 94 and the getFieldProperties method 96.

In various embodiments, the specific software instructions, data structures and data that implement various embodiments of the present invention are typically incorporated in the extender module 30. Generally, an embodiment of the present invention is tangibly embodied in a computer-readable medium, for example, the memory 50 and is comprised of instructions which, when executed by the processor 42, cause the computer system 40 to utilize the present invention. The memory 50 may store the software instructions, data structures and data for any of the operating system 70, terminal emulator 22, extender module 30 and test tool 24 in semiconductor memory, in disk memory, or a combination thereof.

The operating system 70 may be implemented by any conventional operating system, AIX® (Registered Trademark of International Business Machines Corporation), UNIX® (UNIX is a registered trademark of the Open Group in the United States and other countries), Windows® (Registered Trademark of Microsoft Corporation), Linux®, Solaris® (Registered trademark of Sun Microsystems Inc.) and HP-UX® (Registered trademark of Hewlett-Packard Development Company, L.P.).

In various embodiments, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system illustrated in FIG. 2 is not intended to limit the present invention. Other alternative hardware environments may be used without departing from the scope of the present invention.

Figure 3:
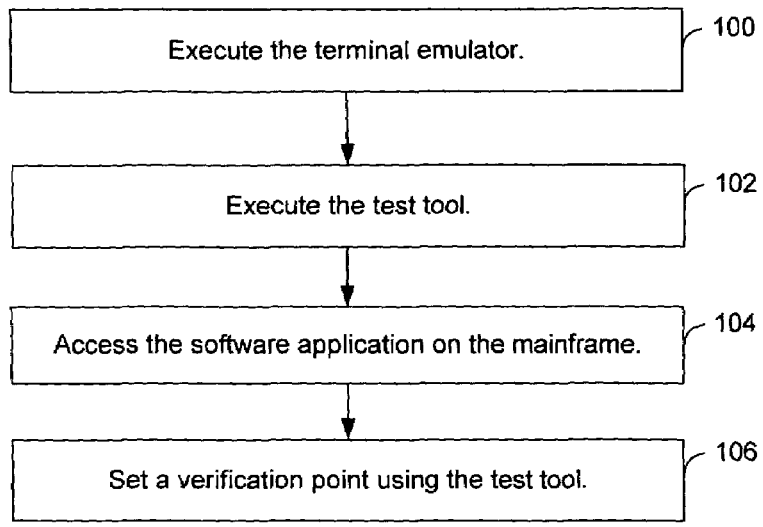
FIG. 3 depicts flowchart of an embodiment of a technique to test software.

FIG. 3 depicts a flowchart of an embodiment of testing the software application 74 of FIG. 2. In step 100, the terminal emulator 22 (FIG. 2) is executed. The terminal emulator 22 (FIG. 2) is used to display a text-based screen of a software application. The text-based screen is associated with a screen Java object. The text-based screen has a plurality of text-based fields. Each text-based field is associated with a field Java object. In step 102, the test tool is executed. In step 104, the software application 74 (FIG. 2) is accessed and supplies information for a text-based screen to the terminal emulator 22 (FIG. 2). The terminal emulator 22 (FIG. 2) displays the text-based screen from the software application 74 (FIG. 2). In step 106, a user sets a verification point using the test tool 24 (FIG. 2) to test the software application 74 (FIG. 2).

Figure 4:
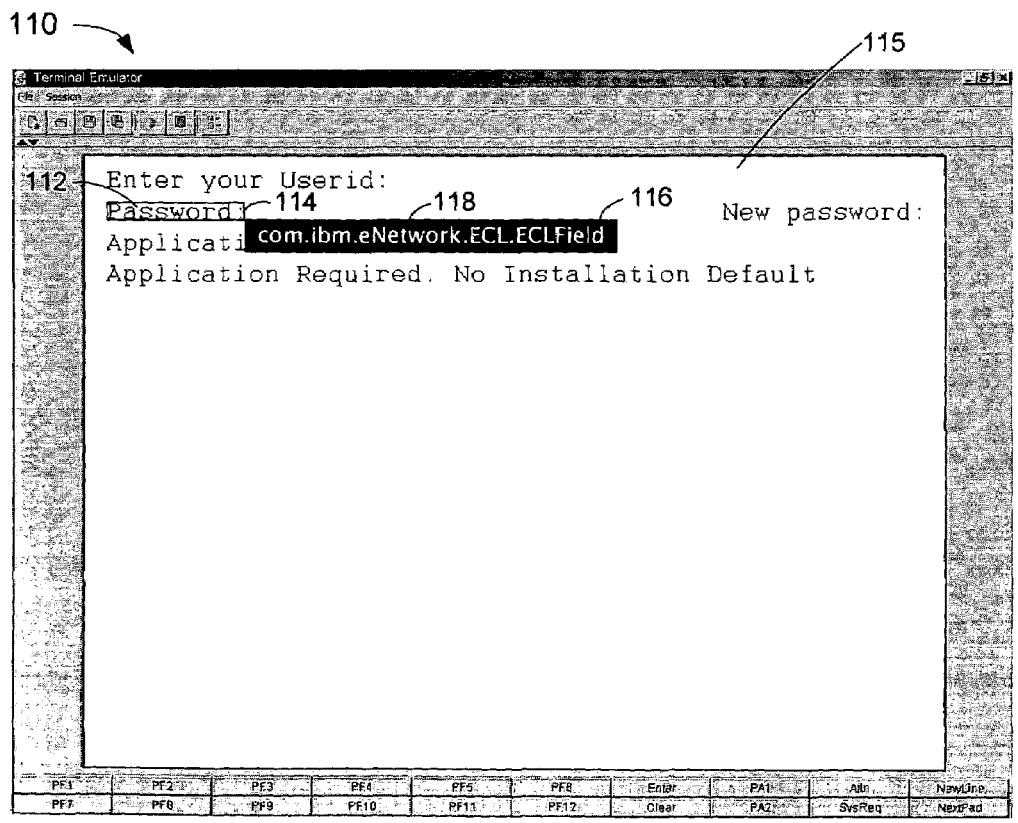
FIG. 4 depicts an exemplary text-based screen.

FIG. 4 depicts an exemplary text-based screen 110. The text-based screen 110 comprises fields, for example, the field 112 in rectangle 114 in row two of the text area 115. In various embodiments, the test-tool invokes the getRectangle method 94 (FIG. 2) to determine the boundary of the rectangle 114 to display which encompasses the field 112. In some embodiments, in addition to displaying the rectangle 114, the test tool also displays a solid box 116 that contains information about the field 112. In this example, the solid box 116 contains the class name of the Host Access Class Library object 118 that represents the field 112. In this example, the text area 115 of the text-based screen 110 has a white background with black text. In other embodiments, the text area 115 of the text-based screen 110 has a color, such as black, with white text. In addition, in this example, the solid box 118 is black with white text. In other embodiments, the solid box is 118 is white with black text.

Figure 5:
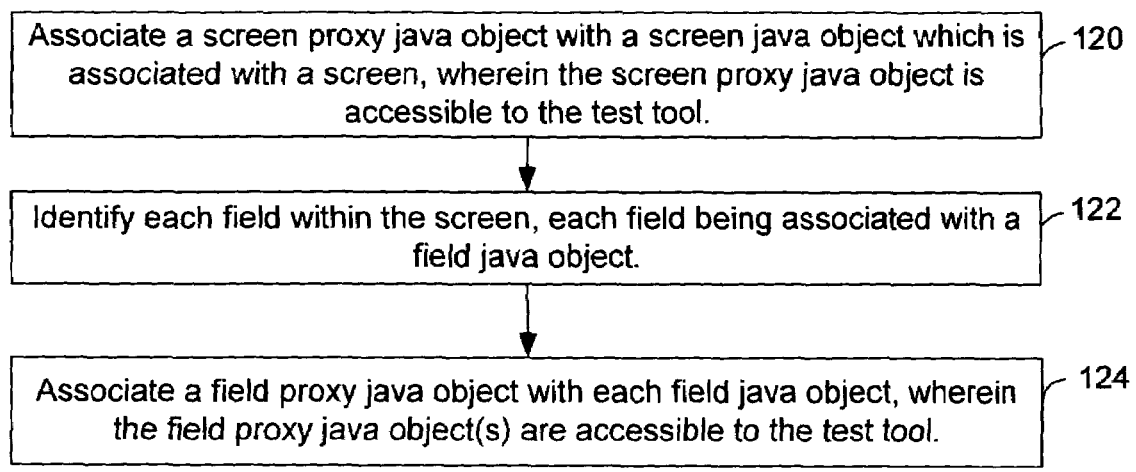
FIG. 5 depicts a flowchart of an embodiment of a technique of the extender module of FIG. 1 which identifies the field proxy Java objects associated with a screen.

FIG. 5 depicts a flowchart of an embodiment of a technique of the extender module 30 (FIG. 2) to the field proxy Java objects associated with a screen. The fields of a text area of the screen are identified and the associated field proxy Java objects are provided to the test tool 24 of FIG. 1. In various embodiments, the flowchart of FIG. 5 is implemented in the getChildren method 92 (FIG. 2) of the extender module 30 (FIG. 2). The getChildren method 92 (FIG. 2) typically invokes other methods to implement the flowchart of FIG. 5.

In step 120, the extender module 30 (FIG. 2) associates a screen proxy Java object 88 (FIG. 2) with a screen Java object 84 (FIG. 2) which is associated with the screen 110 (FIG. 4). The screen proxy Java object 88 (FIG. 2) is accessible to the test tool 24 (FIG. 2). In step 122, each field within the screen is identified. In various embodiments, a GetFieldList method of the Host Access Class Library is invoked to identify the fields. Each field is associated with a field Java object 86 (FIG.

2). In step 124, the extender module 30 (FIG. 2) associates a field proxy Java object 90 (FIG. 2) with each field Java object 86 (FIG. 2). The field proxy Java object(s) 90 (FIG. 2) are accessible to the test tool 24 (FIG. 2). In various embodiments, the test tool constructs an object map for the screen using the getchildren method 92 (FIG. 2).

Figure 6:
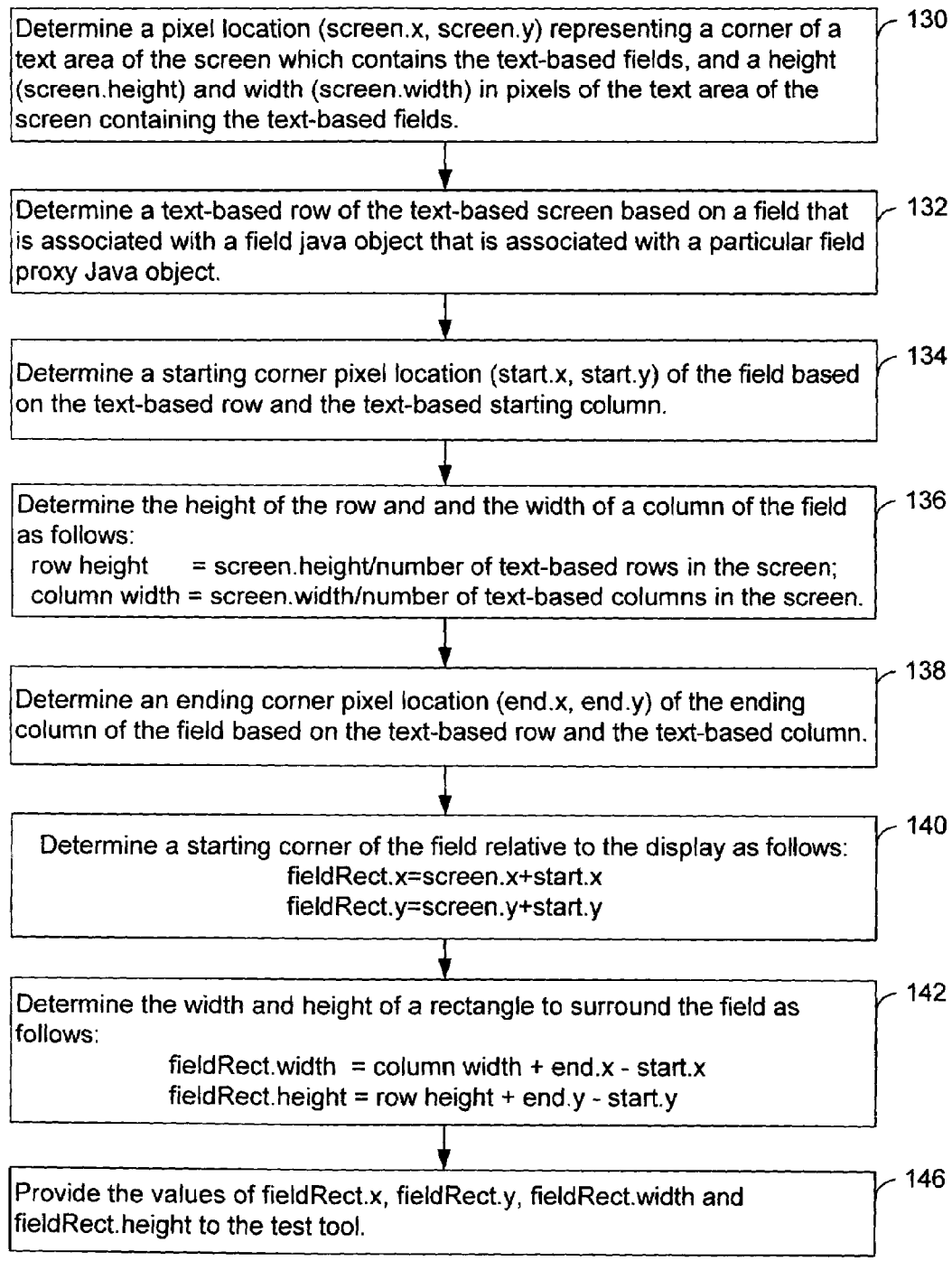
FIG. 6 depicts a flowchart of an embodiment of a technique of the extender module of FIG. 1 which determines a boundary of a field, that is, of a rectangle encompassing the field.

FIG. 6 depicts a flowchart of an embodiment of a technique of the extender module 30 of FIG. 2 to determine a boundary of a rectangle encompassing a field. The boundary is supplied to the test tool 24 (FIG. 2). The flowchart of FIG. 6 is typically implemented by the getRectangle method 94 (FIG. 2) of the extender module 30 (FIG. 2). The getRectangle method 94 (FIG. 2) typically invokes other methods to implement the flowchart of FIG. 6.

In step 130, a pixel location (screen.x, screen.y) representing a corner of a text area of the screen which contains the text-based fields, and a height (screen.height) and width (screen.width) in pixels of the text area containing the text-based fields is determined. The corner of the text area is typically the upper, left corner. The x-coordinate represents a horizontal pixel position on the display, and the y-coordinate represents a vertical pixel position on the display.

In step 132, a text-based row of the text-based screen is determined based on a field that is associated with the field Java object that is associated with a particular field proxy Java object. In some embodiments, the test tool indicates the particular field proxy Java object.

In step 134, a starting corner pixel location (start.x, start.y) of the field is determined based on the text-based row and the text-based starting column. In various embodiments, the starting corner pixel location is the upper, left corner of the first cell, which is in the first column, of the field. In step 136, the height of the row and the width of a column of the field is determined as follows:

row height=screen.height/number of text-based rows in the screen;

column width=screen.width/number of text-based columns in the screen.

In step 138, an ending corner pixel location (end.x, end.y) of the ending column of the field is determined based on the text-based row and the text-based column. In various embodiments, the ending corner pixel location is the upper left corner of the last cell, which is in the last column, of the field. In step 140, a starting corner of the field relative to the display is determined as follows:

fieldRect.x=screen.x+start.x;

fieldRect.y=screen.y+start.y.

In step 142, the width and height of a rectangle in pixels to surround the field are determined as follows:

fieldRect.width=char.width+end.x−start.x;

fieldRect.height=char.height+end.y−start.y.

In step 144, the values of fieldRect.x, fieldRect.y, fieldRect.width and fieldRect.height are provided to the test tool. The values fieldRect.x, fieldRect.y, fieldRect.width and fieldRect.height represent a boundary of the field associated with the field proxy Java object. The values fieldRect.x and fieldRect.y represent a particular pixel location associated with a corner of the field. The value of fieldRect.width represents the width of the field and the value of fieldRect.height represents the height of the field. In various embodiments, the test tool uses the values of fieldRect.x, fieldRect.y, fieldRect.width and fieldRect.height to identify the field on the text-based screen. For example, one test tool displays a red rectangle around the field based on the values of fieldRect.x, fieldRect.y, fieldRect.width and fieldRect.height. In this way, even though the text-based screen does not display fields as Java objects, the test tool 22 (FIG. 2) can identify fields of the text-based screen. Therefore, the test tool 22 (FIG. 2) can be used to test software applications using text-based screens and software applications that have a graphical user interface comprising Java objects.

In some embodiments, when a field spans more than one row, each row of the field is associated with a boundary, that is, a set of values of fieldRect.x, fieldRect.y, fieldRect.width and fieldRect.height. The set of values for each row of the field is provided to the test tool.

Figure 7:
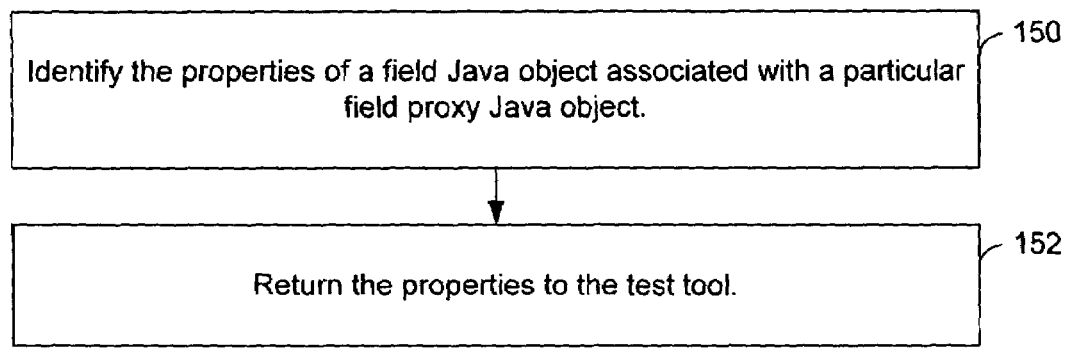
FIG. 7 depicts a flowchart of an embodiment of a technique of the extender module of FIG. 1 which identifies the properties of a field and provides those properties to the test tool.

FIG. 7 depicts a flowchart of an embodiment of a technique to identify the properties of a field and provide those properties to the test tool of FIG. 2. In some embodiments, the flowchart of FIG. 7 is implemented in the getFieldProperties method 96 (FIG. 2) of the extender module 30 (FIG. 2). The getFieldProperties method 96 typically invokes other methods to implement the flowchart of FIG. 7. In various embodiments, the test tool 24 (FIG. 2) invokes the getfieldProperties method 96 when setting a verification point.

In step 150, the properties of a field Java object associated with a particular field proxy Java object are identified. For example, the properties may comprise the color, font, and whether the field associated with the field Java object is blinking. In step 152, the properties are returned to the test tool 24 (FIG. 2).

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A computer-implemented method of identifying a boundary of a field of a text-based screen of a software application for a test tool, comprising:
   executing the test tool;
   executing the software application, the software application displaying a text-based screen having a text area, the text-based screen being associated with a screen Java object, the text-based screen having a plurality of text-based fields in the text area, the text-based fields being associated with respective field Java objects, wherein a particular text-based field of the text-based fields is associated with a particular field Java object of the field Java objects;
   associating a screen proxy Java object with the screen Java object, the screen proxy Java object being accessible to the test tool;
   associating field proxy Java objects with respective field Java objects, the field proxy Java objects being accessible to the test tool, wherein the particular field Java object is associated with a particular field proxy Java object of the field proxy Java objects;
   determining a starting screen pixel location of the text area of the text-based screen associated with the screen Java object;
   determining a text-based row, a text-based starting column and a text-based ending column of the particular text-based field which is associated with the particular field Java object that is associated with the particular field proxy Java object;
   determining a field corner pixel location of the particular text-based field based on the text-based row, the text-based starting column and the starting screen pixel location, wherein said determining the field corner pixel location of the particular text-based field comprises: determining a starting corner pixel location of the particular text-based field based on the text-based row and the text-based starting column; and computing the field corner pixel location of the particular text-based field based on the starting corner pixel location and the starting screen pixel location;
   determining a field pixel width of the particular text-based field based on the text-based starting column and the text-based ending column;
   determining a field pixel height of the text-based row;
   providing the field corner pixel location, the field pixel width and the field pixel height to the test tool; and
   in response to the test tool, displaying a visual indicator, in the text area of the text-based screen identifying the particular text-based field based on the field corner pixel location, the field pixel width and the field pixel height.

2. The method of claim 1 wherein said determining the field pixel height comprises:
   determining a screen pixel height of the text area;
   determining a number of text-based rows in the text area; and
   computing a row pixel height by dividing the screen pixel height by the number of text-based rows in the text area, wherein the field pixel height is based on the row pixel height.

3. The method of claim 2 wherein said determining the field pixel width of the particular text-based field comprises:
   determining a column pixel width of the text-based ending column;
   determining a starting horizontal pixel location of the text-based starting column;
   determining an ending horizontal pixel location of the text-based ending column; and
   setting the field pixel width equal to the column pixel width plus the ending horizontal pixel location minus the starting horizontal pixel location.

4. The method of claim 1 wherein said determining the field pixel width of the particular text-based field comprises:
   determining a column pixel width of the text-based ending column;
   determining a starting horizontal pixel location of the text-based starting column;
   determining an ending horizontal pixel location of the text-based ending column; and
   computing the field pixel width based on the column pixel width, the starting horizontal pixel location and the ending horizontal pixel location.

5. The method of claim 1 further comprising:
   in response to the test tool, identifying at least one property of the particular text-based field associated with the particular field Java object associated with the particular field proxy Java object; and
   providing the at least one property of the particular text-based field associated with the particular field Java object associated with the particular field proxy Java object to the test tool.

6. The method of claim 5 wherein one property of the at least one property indicates whether the particular text-based field associated with the particular field Java object that is associated with the particular field proxy Java object is blinking.

7. The method of claim 1 wherein the visual indicator is a rectangle around the particular text-based field.

8. The method of claim 1 wherein the text-based screen comprises a plurality of cells, organized in rows and columns, wherein said particular field comprises at least two cells of said plurality of cells, each cell of said at least two cells being having a character.

9. The method of claim 1 further comprising:
identifying the plurality of text-based fields of the text area of the text-based screen associated with the screen Java object.

10. An article of manufacture comprising a computer readable device comprising computer readable program code for identifying a boundary of a field of a displayed text-based screen of a software application for a test tool, the text-based screen being associated with a screen Java object, the text-based screen having a text area, the text-based screen having a plurality of text-based fields in the text area, the text-based fields being associated with respective field Java objects, wherein a particular text-based field of the plurality of text-based fields is associated with a particular field Java object of the plurality of field Java objects, said article of manufacture comprising:
computer readable program code for associating a screen proxy Java object with the screen Java object, the screen Proxy Java object being accessible to the test tool;
computer readable program code for associating field proxy Java objects with respective field Java objects, the field proxy Java objects being accessible to the test tool, wherein the particular field Java object is associated with a particular field proxy Java object of the field proxy Java objects;
computer readable program code for determining a starting screen pixel location of the text area of the text-based screen associated with the screen Java object;
computer readable program code for determining a text-based row, a text-based starting column and a text-based ending column of a particular text-based field of the plurality of text-based fields, the particular text-based field being associated with a particular field Java object of the field Java objects, the particular field Java object being associated with a particular field proxy Java object;
computer readable program code for determining a field corner pixel location of the particular text-based field based on the text-based row, the text-based starting column and the starting screen pixel location, wherein said computer readable program code for determining said field corner pixel location of the particular text-based field comprises: computer readable program code for determining a starting corner pixel location of the particular text-based field based on the text-based row and the text-based starting column: and computer readable program code for computing the field corner pixel location of the particular text-based field based on the starting corner pixel location and the starting screen pixel location;
computer readable program code for determining a field pixel width of the particular text-based field based on the text-based starting column and the text-based ending column;
computer readable program code for determining a field pixel height of the text-based row;
computer readable program code for providing the field corner pixel location, the field pixel width and the field pixel height to the test tool; and
computer readable program code for, in response to the test tool, displaying a visual indicator in the text area of the text-based screen identifying the particular field on the text-based screen based on the field corner pixel location, the field pixel width and the field pixel height.

11. The article of manufacture of claim 10 wherein said computer readable program code for determining the field pixel height comprises:
computer readable program code for determining a screen pixel height of the text area of the text-based screen associated with the screen Java object;
computer readable program code for determining a number of text-based rows in the text area of the text-based screen associated with the screen Java object; and
computer readable program code for computing a row pixel height by dividing the screen pixel height by the number of text-based rows in the text area, wherein the field pixel height is based on the row pixel height.

12. The article of manufacture of claim 10 wherein said computer readable program code for determining the field pixel width of the particular text-based field comprises:
computer readable program code for determining a column pixel width of the text-based ending column;
computer readable program code for determining a starting horizontal pixel location of the text-based starting column;
computer readable program code for determining an ending horizontal pixel location of the text-based ending column; and
computer readable program code for computing the field pixel width based on the column pixel width, the starting horizontal pixel location and the ending horizontal pixel location.

13. The article of manufacture of claim 10 further comprising:
computer readable program code for in response to the test tool, identifying at least one property of the particular text-based field associated with the particular field Java object associated with the particular field proxy Java object; and
computer readable program code for providing at least one property of the particular text-based field based on the particular field Java object associated with the particular field proxy Java object.

14. The article of manufacture of claim 13 wherein one property of the at least one property indicates whether the particular text-based field is blinking.

15. An apparatus for identifying a boundary of a field of a text-based screen for a test tool, comprising:
a processor; and
a memory storing:
a test tool, executable by the processor; and
a software application, executable by the processor, the software application when executed causes the processor to display a text-based screen having a text area, the text-based screen being associated with a screen Java object, the text-based screen having a plurality of text-based fields in the text area, the text-based fields being associated with respective field Java objects, wherein a particular text-based field of the text-based fields is associated with a particular field Java object of the field Java objects;
the memory also storing an extender module comprising instructions that when executed cause the processor to:
associate a screen proxy Java object with the screen Java object, the screen proxy Java object being accessible to the test tool;

associate field proxy Java objects with respective field Java objects, the field proxy Java objects being accessible to the test tool, wherein the particular field Java object is associated with a particular field proxy Java object of the field proxy Java objects;

determine a starting screen pixel location of the text area of the text-based screen associated with the screen Java object;

determine a text-based row, a text-based starting column and a text-based ending column of the particular text-basedfield which is associated with the particular field Java object that is associated with the particular field proxy Java object;

determine a field corner pixel location of the particular text-based field based on the text-based row, the text-based starting column and the starting screen pixel location, wherein the instructions that determine the field corner pixel location of the particular text-based field when executed cause the processor to: determine a starting corner pixel location of the particular text-based field based on the text-based row and the text-based starting column; and compute the field corner pixel location of the particular text-based field based on the starting corner pixel location and the starting screen pixel location;

determine a field pixel width of the particular text-based field based on the text-based starting column and the text-based ending column;

determine a field pixel height of the text-based row;

provide the field corner pixel location, the field pixel width and the field pixel height to the test tool; and in response to the test tool, display a visual indicator in the text area of the text-based screen identifying the particular text-based field on the text-based screen based on the field corner pixel location, the field pixel width and the field pixel height.

16. The apparatus of claim 15 wherein said instructions that determine the field pixel height when executed cause the processor to:

determine a screen pixel height of the text area of the text-based screen associated with the screen Java object;

determine a number of text-based rows in the text area of the text-based screen associated with the screen Java object; and compute a row pixel height by dividing the screen pixel height by the number of text-based rows in the text area, wherein the field pixel height is based on the row pixel height.

17. The apparatus of claim 15 wherein said instructions that determine the field pixel width of the particular text-based field when executed cause the processor to:

determine a column pixel width of the text-based ending column;

determine a starting horizontal pixel location of the text-based starting column;

determine an ending horizontal pixel location of the text-based ending column; and compute the field pixel width based on the column pixel width, the starting horizontal pixel location and the ending horizontal pixel location.

18. The apparatus of claim 15 wherein said instructions when executed cause the processor to:

in response to the test tool, identify at least one property of the particular text-based field associated with the particular field Java object associated with the particular field proxy Java object; and provide at least one property of the particular text-based field associated with the particular field Java object associated with the particular field proxy Java object.

19. The apparatus of claim 15 wherein one property of the at least one property indicates whether the particular text-based field associated with the particular field Java object that is associated with the particular field proxy Java object is blinking.

* * * * *